ically stripped of their volatile constituents, are removed from stripping portion 16 of first zone 2 by way of line 17 while a light unsaponifiable cut (including steam) is removed by way of stabilizing portion 18 and vent 19. A side stream of rosin acids and fatty acids with some $C_{16}$ palmitic acid is withdrawn from middle portion 21 of first zone 2 and is transmitted by way of carryover means (shown as line 22) to medial portion 23 of fractionating zone 4. Heater 13 is located at stripping portion 16 because it is necessary to use the entire height of tower 1 to knock down color bodies, separate a low boiling cut and withdraw the side stream. Stripping and stabilizing in first zone 2 takes place so quickly that degradation of heat sensitive constituents is minimized even though high temperatures are needed for these operations.

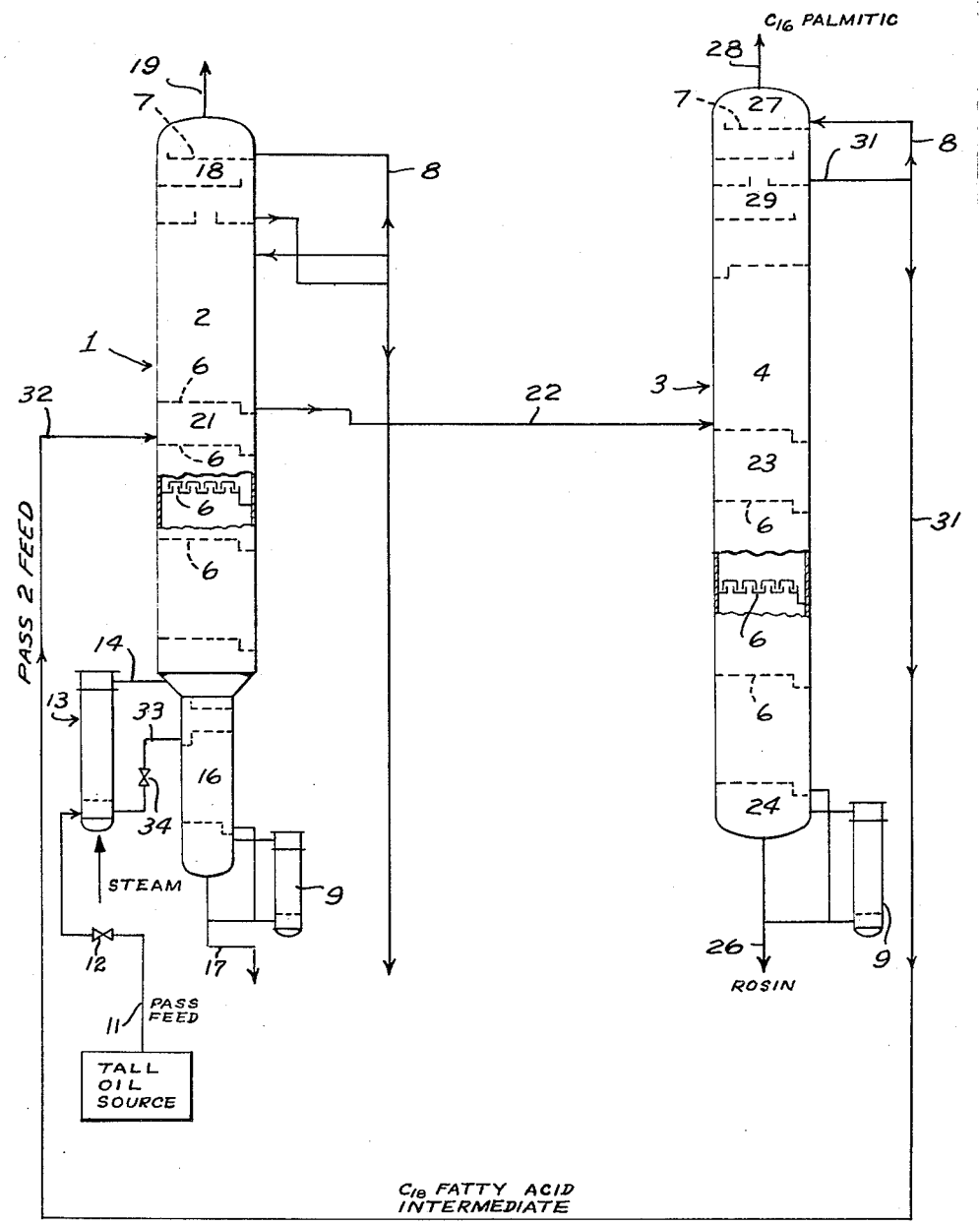

3,216,909
TALL OIL PROCESSING SYSTEM
Dellason F. Bress, 26 Gallinson Drive, Berkeley Heights, N.J.
Filed Mar. 4, 1963, Ser. No. 262,605
1 Claim. (Cl. 202—154)

This invention relates to tall oil distillation for producing rosin acids and unsaturated $C_{18}$ acids principally oleic and linoleic. A distillation system and process are contemplated which can produce commercial grades of unsaturated $C_{18}$ acids in a two-pass block operation.

As in prior tall oil distillation systems, a first tower is followed by a fractionating tower and recycling of unsaturated $C_{18}$ acids intermediate through the fractionating tower in block operation is employed to improve the quality of the unsaturated $C_{18}$ acids product. The present disclosure contemplates the inclusion of a stabilizing zone in the first tower to take a low-boiling unsaponifiables cut and accommodate block recycling through the first tower as well as the fractionating tower. By this expedient four separations are achieved in only two passes through the system thereby producing commercial unsaturated $C_{18}$ acids.

A heater is used for flashing feed tall oil before it enters the first tower for the first pass. A further aspect of this teaching is to connect this heater for additional service as a reboiler during the second pass. Thus the cost of adapting the first tower for two-pass service is greatly reduced.

Basically this advance offers the improved efficiency of two-pass operation whereas prior two-tower units required at least three passes for satisfactory unsaturated $C_{18}$ acids purification.

These and other advantages will appear more fully from the following detailed description and the accompanying flow diagram of a system according to this invention.

Tall oil is obtained by the acidulation of spent pulping liquor. During the manufacture of cellulose fibers, a mass is separated from spent pulping liquor. After being decomposed by acid; the mass yields raw tall oil, a dark colored, unpleasant smelling liquid. Tall oil consists of rosin acids such as abietic and pimaric acids, unsaturated $C_{18}$ fatty acids such as oleic acid and linoleic acid, smaller amounts of hydroxy acids, saturated fatty acids, sterols and higher fatty alcohols as well as other unsaponifiable matter. Raw tall oil usually comprises from 30% to 65% rosin acids, from 30% to 65% fatty acids and from 7% to 14% unsaponifiables.

The principal products from tall oil are unsaturated $C_{18}$ acids (used for drying oils in paints) and rosin acids (used in the manufacture of adhesives and synthetic resins).

Tall oil feed is usually dehydrated in advance of distillation. Dehydration may be accomplished by evaporation. Evacuation as well as surface enlargement promote evaporation.

As shown in the drawing, this sytsem includes first tower 1 (defining first zone 2) followed by fractionating tower 3 (defining fractionating zone 4) each including a large number of trays 6. Condensing trays 7 and pump-back lines 8 are at the top of each tower and a reboiler 9 is at the base.

The system is block operated in two passes with storage as required. During the first pass the dehydrated tall oil is preheated to a temperature in the range from 450° F. to 550° F. by means not shown. The tall oil enters by way of line 11 and valve 12 to heater 13 wherein it is flashed with steam under vacuum. The flashed crude and steam are conducted to first tower 1 via line 14.

Pitch and heavy unsaponifiables, after being thorough-

The main function of fractionating tower 3 during the first pass is to separate rosin acids from fatty acids. In fractionating zone 4 rosin acid product is withdrawn via lower portion 24 and line 26. This rosin acid requires no further refining. Low-boiling substances including saturated $C_{16}$ palmitic acid exit via top 27 and line 28. An unsaturated $C_{18}$ acid intermediate with undesirable $C_{16}$ palmitic acid therein is withdrawn from upper portion 29 of fractionating zone 4 via line 31 and is generally stored for further processing.

The unsaturated $C_{18}$ acid intermediate is returned to first zone 2 by way of return means (shown as line 32) for the second pass. In this second pass additional $C_{16}$ palmitic acid is separated from the unsaturated $C_{18}$ acid intermediate via stabilizing portion 18 and vent 19. Unsaturated $C_{18}$ acid intermediate is cycled from stripping portion 16 by way of line 33 and valve 34 for reboiling in heater 13. This intermediate is then recycled to stripping portion 16 via line 14.

Second pass requirements for first tower 1 differ from those requirements which prevailed during the first pass. In first tower 1, instead of separating the bulk of a feed from a residue and stabilizing that feed, a more conventional fractionating operation is required in the second pass. This fractionating operation is designed to separate saturated $C_{16}$ palmitic acid from the unsaturated $C_{18}$ acid intermediate. Accordingly, the unsaturated $C_{18}$ acid intermediate is introduced into the middle portion 21 of first zone 2. Heater 13 is arranged to serve not as a feed flasher but as a reboiler during this second pass.

Fractionating tower 3 fulfills its usual role during the second pass. A side stream of refined unsaturated $C_{18}$ acids is delivered from first tower 1 by means of line 22 to medial portion 23 of fractionating zone 4. Whatever unsaturated $C_{16}$ palmitic acid may have resulted from prior processing is exhausted via top 27 and line 28. Additional rosin acids product is removed via lower portion 24 and line 26. Unsaturated $C_{18}$ acids product is removed from upper portion 29 through line 31.

Typical product specifications attained by this process are set forth in Tables I and II.

Table I

Rosin:
Color _____ X or lighter.
Acid number _____ 168.
Fatty acids _____ 1.5%.
Unsaponifiables _____ 3% (max.).
Softening point _____ 83° C.

Table II

Fatty acid:
Fatty acids, percent _____ 99.2
Rosin acids, percent _____ 0.5
Unsaponifiables, percent _____ 0.6
Moisture _____ None
Acid number _____ 199

Fatty acid:
| | |
|---|---|
| Saponification number | 200 |
| Gardner color (1933) | 3 |
| Viscosity, SSU at 100° F. | 105 |
| Specific gravity 62/60 | 0.9048 |
| Titre, ° C. | 4.3 |
| Flash point, ° F. | 375 |
| Fire point, ° F. | 435 |

It will be apparent to those skilled in process engineering that changes may be made in the details of this disclosure without departing from the main theme of invention defined by the claim.

What is claimed is:

A system for producing unsaturated $C_{18}$ acids and rosin acids from substantially water-free crude tall oil, the system comprising a vertical elongated first tower having a stripping portion and a middle portion and a stabilizing portion in ascending order therein, a source of the tall oil, a reboiler heater at the bottom of said first tower, a second heater above the reboiler heater connected in flow series with the source of tall oil and with the stripping portion for delivering the tall oil to the stripping portion at a temperature in the range from 450° F. to 550° F., means for introducing steam into the stripping portion, means communicating in flow series with the stripping portion for exhausting pitch and heavy unsaponifiables from the tall oil, vent means communicating in flow series with the stabilizing portion to exhaust overhead vapors including steam and light unsaponifiables from the tall oil, a vertical elongated fractionating second tower having a bottom portion and an upper portion and a top in ascending order, carryover means communicating in flow series between the middle portion of the first tower and the middle of the fractionating tower to deliver a side stream comprising rosin acids and fatty acids from the tall oil in the first tower to the fractionating tower, means communicating in flow series with the top of the fractionating tower to withdraw low boiling substances including saturated $C_{16}$ palmitic acid therefrom, means communicating in flow series with the bottom portion of the fractionating tower for withdrawing rosin acids product therefrom, return means communicating in flow series between the upper portion of the fractionating tower and the middle portion of the first tower to return in a second pass an unsaturated $C_{18}$ acid intermediate from the fractionating tower to the first tower whereby a saturated $C_{16}$ palmitic acid fraction is exhausted from the unsaturated $C_{18}$ acid intermediate via the vent means and whereby a refined unsaturated $C_{18}$ acid side stream is delivered via the carryover means to the fractionating tower for further purification, said second heater functioning as a reboiler for said second pass, means for cycling the unsaturated $C_{18}$ acid intermediate from the stripping portion through the heater for reboiling and return thereto.

References Cited by the Examiner

UNITED STATES PATENTS

| | | | |
|---|---|---|---|
| 2,224,984 | 12/1940 | Potts et al. | 202—61 X |
| 2,402,077 | 6/1946 | Patterson | 202—41 |
| 2,716,630 | 8/1955 | Spangenberg et al. | 260—97.6 |
| 2,886,492 | 5/1959 | Hanson et al. | 202—52 |
| 2,894,880 | 7/1959 | Sisson et al. | 202—52 |
| 2,952,631 | 9/1960 | Hausch | 202—46 X |

OTHER REFERENCES

T. P. Forbath: "Staged Distillation Process Splits Tall Oil," appearing in "Chemical Engineering," vol. 54, No. 6, 1957, pages 226–229.

L. A. Agnello: Editor, "Tall Oil," appearing in "Industrial and Engineering Chemistry," vol. 52, No. 9, 1960, pages 726, 732.

NORMAN YUDKOFF, *Primary Examiner.*

LEON BERCOVITZ, *Examiner.*